Figure 1:
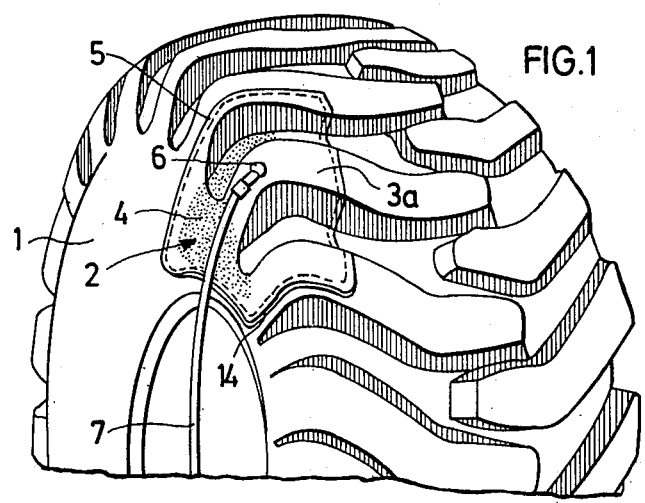

United States Patent [19]

Schelkmann

[11] 4,234,369
[45] Nov. 18, 1980

[54] METHOD FOR REPAIRING AND RETREADING VEHICLE TIRES

[75] Inventor: Wilhelm Schelkmann, Witten, Fed. Rep. of Germany

[73] Assignee: Vakuum Vulk Holdings Limited, Nassau, The Bahamas

[21] Appl. No.: 904,737

[22] Filed: May 11, 1978

Related U.S. Application Data

[63] Continuation of Ser. No. 576,863, May 12, 1975, abandoned.

[30] Foreign Application Priority Data

May 13, 1974 [DE] Fed. Rep. of Germany ....... 2423062

[51] Int. Cl.² ............................................. B29H 17/36
[52] U.S. Cl. ........................................ 156/95; 156/97; 156/286
[58] Field of Search ........................ 156/94, 95, 96, 97, 156/98, 394, 87, 285, 286; 264/36, 313, 314, 316, 326, DIG. 74; 425/11, 14, 17, 383, 389

[56] References Cited

U.S. PATENT DOCUMENTS

| 1,306,602 | 6/1919 | McEwen | 156/96 |
| 2,405,802 | 8/1946 | Taber | 156/96 X |
| 2,421,101 | 5/1947 | Lakso | 156/97 |
| 2,983,305 | 5/1961 | Scher et al. | 156/382 |
| 3,575,756 | 4/1971 | Maus | 156/103 |
| 3,703,422 | 11/1972 | Yosino | 156/286 |
| 3,837,965 | 9/1974 | Mahon et al. | 156/382 |
| 3,982,977 | 9/1976 | Gordon | 156/285 |

FOREIGN PATENT DOCUMENTS

| 746375 | 3/1956 | United Kingdom | 156/96 |
| 1277642 | 6/1972 | United Kingdom | 156/96 |

Primary Examiner—John E. Kittle
Attorney, Agent, or Firm—Schuyler, Birch, McKie & Beckett

[57] ABSTRACT

For use in repairing or retreading tires, particularly large tires for earth-moving equipment and the like, the portion to be repaired or retreaded is covered and surrounded by a flexible enclosure attached to the tire in gas-sealing relationship by an adhesive. The adhesive will remain effective even at the temperatures necessary for vulcanization. The enclosure has a gas connection so that it can be evacuated or pressurized to remove air and gas occlusions. A gasket can be used in conjuction with the adhesive.

12 Claims, 6 Drawing Figures

METHOD FOR REPAIRING AND RETREADING VEHICLE TIRES

This is a continuation, of application Ser. No. 576,863, filed May 12, 1975, now abandoned.

The present invention relates to a method for repairing and retreading vehicle tires, particularly tires for earth-moving vehicles by means of an enclosure which seals in air-tight manner at least that portion of the tire which is to be worked for evacuating air and gas occlusions from the space between enclosure and tire by applying a vacuum and/or overpressure and vulcanizing by heat application the unvulcanized rubber placed on or in the tire.

Both for repairing damaged points on vehicle tires and for retreading worn vehicle tires flexible enclosures made from rubber are used which sealingly enclose the tire, whereby vacuum is made to act on the space between tire and enclosure so that air and gas occlusions are avoided. In most cases vacuum application is continued during vulcanization in the autoclave.

Flexible enclosures of this type become expensive particularly for large tires, and more especially in the case of tires for earth-moving vehicles. In addition, considerable effort is involved in correctly fitting an enclosure in such a way that it provides adequate sealing.

Numerous attempts have therefore been made to find suitable enclosure-less methods for the repair and retreading of tires. In this connection, particularly heatable repair moulds, i.e. devices for eliminating damaged areas on tires have become known which can be adapted to different tire sizes and which have air bellows for exerting a pressure on the points to be repaired. However, it is not possible, for example, to exert a pressure on points located within the tire profile so that repair moulds also fail to provide a satisfactory solution for the repair problem due on the one hand to the relatively high initial costs, and on the other to the limited possibilities of use.

Attempts have also been made to carry out repairs with virtually no accessories by permitting the evacuation of the much feared air occlusions during the application of the repair material such as binding rubber through on the one hand using at the repair points fine roughing less susceptible to air occlusions, for example on inserting tapers, and on the other through the stagewise application or insertion in very fine layers of the repair material, simultaneously ensuring thereby that no air occlusions can form. The tire prepared in this way at the repair point is then heated without accessories in the boiler or autoclave. However, it has been found that even with such careful preparation using fine roughing and inserting or applying ultra-fine binding rubber layers air occlusions cannot adequately reliably be avoided, and particularly when heating without accessories the repaired areas in the autoclave there is a danger of steam and moisture penetrating into the spaces which necessarily form due to the known shrinkage of the binding rubber during vulcanization. In this way bonding of the taper with the carcase is prevented at various points so that the said taper is not fixed with the necessary firm adhesion in the carcase.

Consequently, developments up to the present have shown that a satisfactory vulcanization both in connection with retreading and repair of tires can only take place if there is an all-round sealing of the areas to be vulcanized such as can for example be ensured by using an enclosure, and preferably with the simultaneous application of vacuum and/or overpressure.

Therefore the problem exists of so improving the above-described method that the hitherto necessary work and costs are reduced.

According to the invention, this problem is solved in that the enclosure is stuck to the tire and sealed all round the area provided for vacuum and/or overpressure application by means of an adhesive material which is effective also at the temperatures necessary for vulcanization.

According to the method of the present invention, an enclosure is still used for sealing the working area on the tire with the object of evacuating air and gas occlusions under the influence of vacuum and/or overpressure application, but now in order to produce a sealed space between tire and enclosure a simple adhesion process is used whereby the edges of the enclosure are stuck by means of an adhesive material to the tire and also sealed. This applies both when treating areas for repair and when carrying out retreading, i.e. for enclosing the layer structure of a built tire. Following the sealing of the edges of the enclosure, the latter is applied tightly to the covered material by vacuum and/or overpressure application in order to remove undesired gas and liquid residue. This can take place outside or inside the autoclave in which the vulcanization process is carried out. Other heating methods can be used besides heating in the autoclave.

According to the invention, on covering a tire having a plurality of repair points distributed over the tire periphery or on enclosing the layer structure of a built tire the enclosure is stuck by the adhesive material to the carcase flanks and sealed, in the case of a tire for retreading below the outlet edges of the binding rubber layer bonding the tread to the carcase, and in the case of a repair depending on the position of the repair points.

When performing the method of the invention in this way, an annular enclosure extending over the entire tire periphery is used which only covers the tire side walls or carcase flanks to the extent necessary. Thus, in the case of enclosing a built tire the edges of the enclosure extend to just below the outlet edges of the binding rubber layer bonding the tread to the carcase, and are at this point stuck to the carcase flanks by means of the adhesive material and sealed. In the case of a plurality of repair points distributed over the tire periphery, the procedure is similar whereby the reach of the enclosure on the tire side depends on the position of the repair points. Here again, however, the enclosure is stuck and sealed so that the space between enclosure and tire can be subject to vacuum and/or overpressure treatment.

Advantageously pressure treatment continues during vulcanization in the autoclave or in some other manner. Only in this way is it, for example, possible in the case of a repair when inserting tapers to prevent, when shrinkage occurs, steam or other gaseous or liquid media penetrating between the tapers and the wall of the tapered hole into the carcase.

The heating medium used can be water, steam, hot air or a mixture of steam and air.

The method according to the invention can be used particularly advantageously when repairing a damaged area on the tire. In this case the enclosure used is a flexible cover, for example, of rubber provided with a vacuum connection which covers the area to be repaired which is stuck all round this point to the tire by means of an adhesive material and sealed. The advantages are then particularly clear because in the case of individual repair points, e.g. on a tire of an earth-moving vehicle it is unnecessary to fit an enclosure corresponding to the particular tire size resulting in labour and cost-saving, and instead it is possible to use a flexible cover with a vacuum connection which need not be much larger than the point to be repaired. Thus, in the case of a repair the initial procedure, e.g. roughing and applying the raw rubber to the repair point of the tire is carried out in the conventional manner, being followed by the all-round sealing using the flexible cover of the repair point located on the carcase flank or in the actual profile, whereupon the cover is stuck by means of the adhesive material to the tire surface surrounding the repair point and is sealed. By applying vacuum and/or over-pressure all the gas occlusions or the like are evacuated through the vacuum connection whilst the flexible cover tightly engages with the surface of the repair point.

In this connection the repair point can be located either on the outside or the inside of the tire, or both in superimposition.

The flexibility of the cover is selected in such a way that it is possible to adapt the edges of the cover to the profile course in order to seal the cover on the tire. The particular advantage of the method according to the invention is that damaged areas located wholly or partly in the profile can be repaired. Folds which may occur in the central area of the applied flexible enclosure are not disadvantageous for the present method. However, the particular areas can be covered with a smooth underlayer if marks on the tire cover resulting from the folds are considered undesirable.

In any case the work time when using a flexible cover which only covers the repair point is greatly reduced, and it is no longer necessary to provide an enclosure enclosing the entire tire which particularly in the case of large tires such as for earth-moving vehicles is very expensive. Pressure application is continued during the heating of the tire, for example in the autoclave in order to ensure the quality of the vulcanization process.

The adhesive material used, for example, can be binding rubber of the type used as an intermediate layer between the tread and carcase during retreading operations. This material has the advantage of always being available in places where tires are retreaded and/or repaired. However, it is also conceivable to use Teflon ® strips.

In most cases it is advantageous to use as the adhesive material crude rubber, i.e. natural or artificial rubber such as binding rubber in a mixture which is not vulcanizable in heat and remains plastically deformable, i.e. for example a mixture without vulcanizing agents such as sulphur and accelerators. This has the advantage that due to the adhesiveness and plasticity reliable adhesion and sealing are ensured, as well as simultaneously an easy detachment at the end of the particular treatment process without it being necessary to remove residue from the tire by grinding or the like. Furthermore, the plastic adhesive substance can be used several times. When retreading it is advantageous to use along the adhesion and sealing edge of the enclosure additionally a preferably elastic annular gasket in conjunction with the adhesive material in a manner to be explained hereinafter.

It can be advantageous if the edges for sticking the enclosure are initially cleaned and coated with solution. A reliable adhesion of the edges of the enclosure is then even possible if, as is often the case certain impurities such as loose rubber dust or the like have been left behind on the repair point.

In the case of a repair the tire whose repair point has been covered in the manner according to the invention can be further treated through vulcanizing the repair point by thermal irradiation and/or convection, for example by incorporating heating elements in the enclosure in the form of a cover, making it unnecessary to insert the whole tire in the autoclave.

The adhesive material can be applied in various ways which are substantially determined from the most appropriate utilisation of the particular type of adhesive. Thus, the adhesive material can be applied to the bottom of the edges of the enclosure and/or the edges of the enclosure which are to be attached. However, as in the case of using binding rubber as the adhesive material, it can be advantageous to bridge the junctions between the edges of the enclosure and the carcase with adhesive material.

In special cases it can also be advantageous to roughen the tire areas which are to receive the adhesive material in order to further improve the adhesion of the latter. If as a result the enclosure adheres very firmly to the tire at the end of vulcanization and portions of the enclosure edge remain stuck to the tire on removing the enclosure, such residue can easily be ground away or can be left on the tire, if for example the repair point happens to be on the inside of a tubeless tire.

If it is desired to ensure that the enclosure can always be easily removed from the tire at the end of vulcanization, a tire area with a smooth surface or a surface which has been prepared in some other way for avoiding an undetachable connection between enclosure and tire, e.g. by coating with silicon, is provided for receiving the adhesive material.

Figure 2:
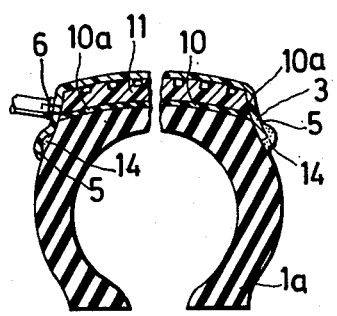
Figure 3:
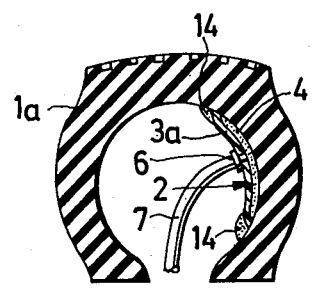
Figure 6:
Figure 4:
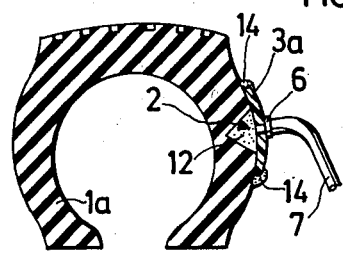
Figure 5:
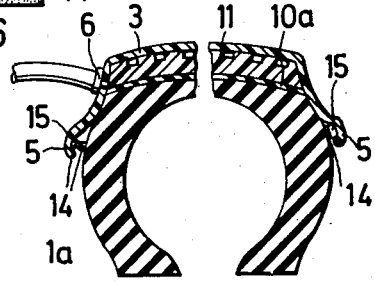

The invention is explained hereinafter relative to certain embodiments with reference to the drawings, wherein show:

FIG. 1, is a perspective view of the upper half of a tire for an earth-moving vehicle with a repair point covered by a flexible cover serving as the enclosure;

FIG. 2, a cross-sectional view of a tire with an enclosure stuck and sealed to the tire side walls;

FIG. 3, a cross-sectional view of a tire with an inner repair point covered in accordance with the invention;

FIG. 4, a cross-sectional view of a tire with an outer repair point, whereby a taper is inserted in the carcase and covered in accordance with the invention;

FIG. 5, a cross-sectional view of a tire, whereby the enclosure is sealed with a gasket in conjunction with adhesive material;

FIG. 6, cross-sectional view of coated gaskets.

On the tire 1 of an earth-moving vehicle shown in FIG. 1 is located a repair point given the general reference numeral 2, which is prepared, roughened, filled with unvulcanized binding rubber 4 and smoothed over, being finally enclosed with a flexible cover 3a, for example of rubber material serving as the enclosure. The all-round edge 5 of cover 3a is stuck to the tire along its entire course by means of an adhesive material, in the present case a binding rubber material and sealed, i.e. both along its course on the tire side wall as well as over the profile lands and depressions. Thus the repair point is enclosed and sealed all-round by cover 3a so that via the vacuum connection 6 located on cover 3a and via tube 7 the space between cover 3a and repair point 2 or on the tire can be subjected to pressure treatment by means of vacuum and/or overpressure. As a result all the air occlusions in the space are removed. Advantageously pressure treatment is continued during the subsequent vulcanization process. The latter can take place in an autoclave, but also as a result of local heating, e.g. by thermal irradiation directed at the repair point or by incorporating heating elements in cover 3a.

After vulcanizing repair point 2, cover 3a is again removed from the tire. If appropriate preparation has taken place, for example by sticking edge 5 to smooth tire surfaces or surfaces which have been prepared in some other appropriate manner, the cover 3a can again be easily and completely removed from the tire. If, however, certain points of cover 3a remain adhering to the tire these can easily be ground away.

As shown in FIG. 3, the method can be equally well performed on the inside of tire 1 where a repair patch or binding rubber application 4 is covered by means of cover 3a which is in turn stuck all round to the inside of the tire by means of adhesive material 14, for example binding rubber and is simultaneously sealed. If the repair points are punctures, two covers can be used, one being applied to the outside and the other to the inside of the tire.

FIG. 4 shows the application of cover 3a when fitting a taper 12.

FIG. 2 shows the use of an enclosure 3 whose edges 5 are stuck to carcase 1a by means of adhesive material 14 where they are sealed. The drawing shows a built tire to the prepared carcase 1a of which is applied a tread 11 with the interpositioning of a binding rubber layer 10. As can be seen, the edges 5 of the enclosure are sealed underneath the junctions 10a of binding rubber layer 10 to the flanks of carcase 1a, and namely in the case of the left-hand part of FIG. 2 by placing adhesive material 14, for example, binding rubber underneath edge 5, and in the case of the right-hand part of FIG. 2 by bridging the gap between edge 5 of enclosure 3 and carcase 1a by means of a material strip 14 of adhesive material, for example, binding rubber. Otherwise the method is effected in the manner described relative to FIG. 1.

In connection with FIG. 2, it is also pointed out that the enclosure 3 is an annular enclosure which extends right round the tire periphery unlike cover 3a, whereby the said enclosure 3 can be used both for vulcanizing a tire which is to be retreaded such as that shown in FIG. 2, and when a plurality of repair points are distributed over the tire periphery making the use of several covers 3a according to FIG. 1 inappropriate.

In most cases it is advantageous to use as the adhesive material crude rubber without vulcanizing agents such as sulphur and accelerators, thereby obtaining the adhesive and sealing effects but simultaneously preventing the vulcanizing effect in the adhesive material. Material which is not vulcanizable and remains plastically deformable in heat has the double advantage that at the end of the treatment it can easily be removed from the tire and optionally also from the enclosure, and in addition can be used several times.

Excellent sealing on both sides of a carcase of a tire to be retreaded can be obtained with a rubber gasket, for example by means of a rubber loop, i.e. a circular seal without using adhesive material. The edges 5 of enclosure 3 are stretched over the underlaying gasket 15 sealing with line contact on the carcase. The pressure is obtained through the elasticity of the rubber enclosure used and is increased by the vacuum and/or overpressure acting on the enclosure.

Sealing is improved by using a gasket 15 in conjunction with an adhesive material 14 (cf. FIG. 5). Thus a strip of the above-indicated unvulcanizable adhesive and plastically deformable crude rubber can be placed between gasket 15 and the side of carcase 1a, thus bringing about sealing between the carcase and gasket 15 on the carcase flanks where decorations and markings in relief form are located. The plastically deformable crude rubber sealingly encloses the decorations. The left-hand part of FIG. 5 shows that adhesive material 14 is also present on the two engagement sides of gasket 15, and that the gasket can have a circular cross-section, whereas the right-hand part of FIG. 5 shows a gasket 15 which is again made from an elastic material such as rubber with an intermediate layer of adhesive material 14 between gasket 15 and carcase 1a.

In this connection a further possibility is provided by using a gasket 15 which is coated all round with adhesive material 14 as shown in two different cross-sectional forms in FIG. 6. Such a gasket 15 can be used on several occasions when employing unvulcanizable adhesive and plastically deformable material.

What we claim is:

1. A method for repairing a void in a portion of a vehicle tire comprising the steps of:
    placing unvulcanized rubber in the void;
    covering and enclosing the unvulcanized rubber and at least the portion of the tire immediately surrounding the portion to be repaired with a flexible enclosure;
    attaching the edges of said enclosure to the tire around the portion to be repaired in gas-tight relationship by means of a plastically deformable adhesive that remains effective at the elevated temperature necessary for complete vulcanization of the unvulcanized rubber;
    applying gas pressure conditions to the space between said enclosure and the tire so as to evacuate air and gas occlusions from the space and apply said enclosure tightly against the tire so that said enclosure deforms into tight fitting relationship with the surface contours of the tire; and
    heating the unvulcanized rubber placed in the void to raise its temperature and effect complete vulcanization thereof.

2. A method according to claim 1 wherein the void is located in the tread of the tire, and said enclosure is applied to the tread and deforms into tight fitting relationship with the grooves and ribs of the tread.

3. A method according to claim 1 wherein the void is located in the interior of the tire, and said enclosure is applied to the inner surface of the tire.

4. The method of claim 1 wherein the tire has a plurality of repairable voids distributed over the periphery of the tire carcass, and wherein said enclosure is attached by the said adhesive material to the flanks of the tire carcass.

5. The method of claim 1 wherein said enclosure is provided with a gas connection.

6. The method of claim 1 wherein said adhesive comprises binding rubber of the type used as the intermediate layer between tire tread and tire carcass when carrying out retreading.

7. The method of claim 1 wherein the step of heating to effect vulcanization of the rubber placed in the void involves thermal irradiation and/or convection.

8. The method of claim 7 wherein the enclosure incorporates heating elements for accomplishing the vulcanization.

9. The method of claim 1 wherein said adhesive is applied to the underside of the edge areas of said enclosure.

10. The method of claim 1 wherein the adhesive bridges the junction between the edges of the enclosure and the tire.

11. The method of claim 1 wherein said adhesive comprises crude rubber in a mixture which is not vulcanizable in heat and remains plastically deformable.

12. The method of claim 1 comprising the further step of cleaning the edges of the enclosure before attaching the enclosure to the tire.

* * * * *